United States Patent [19]

Fancher

[11] Patent Number: 4,700,179

[45] Date of Patent: Oct. 13, 1987

[54] CROSSED BEAM HIGH FREQUENCY ANTI-THEFT SYSTEM

[75] Inventor: Philip D. Fancher, Sepulveda, Calif.

[73] Assignee: ICI Americas Inc., Wilmington, Del.

[21] Appl. No.: 885,372

[22] Filed: Jul. 11, 1986

Related U.S. Application Data

[63] Continuation of Ser. No. 754,500, Jul. 12, 1985, abandoned, which is a continuation of Ser. No. 367,715, Apr. 12, 1982, abandoned.

[51] Int. Cl.[4] ............................................. G08B 13/24
[52] U.S. Cl. ..................................................... 340/572
[58] Field of Search ..................... 340/572; 343/6.5 R, 343/6.8 S, 6.5 SS; 342/42

[56] References Cited

U.S. PATENT DOCUMENTS

| | | | |
|---|---|---|---|
| 3,493,955 | 2/1970 | Minasy | 340/572 |
| 4,063,229 | 12/1977 | Welsh et al. | 340/571 |
| 4,160,971 | 7/1979 | Jones et al. | 343/6.5 SS |
| 4,302,846 | 11/1981 | Stephen et al. | 340/572 |
| 4,303,910 | 12/1981 | McCann | 340/572 |
| 4,471,344 | 9/1984 | Williams | 340/572 |

FOREIGN PATENT DOCUMENTS

| | | | |
|---|---|---|---|
| 20062 | 12/1980 | European Pat. Off. | |
| 2551348 | 5/1977 | Fed. Rep. of Germany | 340/572 |
| 2392451 | 12/1978 | France | |

*Primary Examiner*—John Chapman

[57] ABSTRACT

An article surveillance system employs a label or tag containing a non-linear impedance element, such as a semiconductor diode, connected to a metal antenna loop configured to pick up two distinct radio frequency transmissions displaced on either side of a selected center frequency. The non-linear impedance element connects opposing sides of a closed loop section at one end of the antenna to form a tuned tank circuit having a resonant frequency twice that of the selected center frequency. A first transmitter generates a tone modulated radio frequency displaced on one side of the center frequency, and a second transmitter generates a continuous wave radio frequency displaced from the center frequency on the other side. Both transmitter signals are fed separately to respective radiating antennae located adjacent to a surveillance area. The antennae are chosen to produce circularly polarized transmission of both frequencies within the surveillance area. The two different frequencies picked up by the transponder antenna are mixed by the non-linear impedance causing the tank circuit to resonate at a single higher frequency equal to their sum, which is double the center frequency; that resonant frequency is reradiated to be picked up by a receiver antenna or antennae suitably placed with respect to the surveillance zone to be detected by a very narrow band receiver responsive to the sum frequency. The modulating tone signal is derived from the received signal to produce a gradually increasing charge that is compared against a preselected threshold level to trigger an alarm for a fixed interval only when the detected signal is of a sufficient strength and duration.

2 Claims, 6 Drawing Figures

CROSSED BEAM HIGH FREQUENCY ANTI-THEFT SYSTEM

This is a continuation of application Ser. No. 754,500, filed on July 12, 1985 and now abandoned, which is a continuation of application Ser. No. 367,715, filed on Apr. 12, 1982 and now abandoned.

BACKGROUND OF THE INVENTION

1. Field of the Invention

This invention relates generally to electronic article surveillance systems and more particularly, to an article surveillance system that involves the transmission of two distinct radio frequency signals, one of which is tone modulated, that are picked up by a transponder and mixed through a non-linear impedance to be reradiated at a higher frequency equal to their sum, which is detected by a narrow band receiver. This invention is an improvement on the system described in the copending commonly assigned applications of Harold B. Williams, Ser. Nos. 195,572, filed Oct. 9, 1980 now abandoned and 373,251, filed Apr. 29, 1982, now U.S. Pat. No. 4,471,344, issued Sept. 11, 1984. Ser. No. 373,251 is a continuation of Ser. No. 195,572. Both applications are entitled "Dual Frequency Anti-Theft System".

2. Prior Art

Earlier surveillance systems of this type, such as that described in U.S. Pat. No. 4,063,229 to Welsh et al., operate to transmit a single radio frequency to be picked up by an antenna on a transponder tag or label where a non-linear impedance, such as a semiconductor diode, generates a selected harmonic of the transmitted signal that is reradiated for detection by a receiver circuit to the exclusion of the transmitted frequency. However such systems proved unsatisfactory in practice from the standpoint of lacking the sensitivity to reliably detect the presence of a transponder within the surveillance area and of producing false alarms in response to various other conditions, particularly when objects which either strongly reflect radio frequency (RF) signals or behave approximately like the tags in generating harmonics come close to the receiver-transmitter units.

Significantly, the non-linear characteristics inherent in the transmitter circuitry and elements often resulted in harmonics being transmitted along with the fundamental transmission frequency causing the receiver to respond without the presence of a non-linear impedance element in the transponder. If receiver sensitivity has to be reduced to ignore such directly transmitted or reflected harmonics, then lower energy harmonics reradiated by a transponder element which should have been detected under some circumstances might be masked. Although this problem can be minimized by proper shielding and RF filtering in both the transmitter and receiver, the filters would have to be provided with extremely sharp cutoff characteristics so that even a small frequency drift in the transmitted signal, which is multiplied in the harmonic, could easily result in the reradiated frequency being outside of the filter pass band of the receiver. Furthermore in such systems the use of connections between transmitter and receiver to provide the precise reference frequency provides another path for such undesired harmonics to propagate by and that effect is made even greater when a common antenna or closely positioned antennae are used for transmission and reception.

On the other hand, such high frequency signals could readily propagate outside of the intended surveillance area to cause false triggering of the alarm by a remote transponder. As a result, protected articles often could not be located or handled anywhere in the vicinity of the surveillance area. Even then, the high frequency energy might propagate by unpredictable reflections, or even along plumbing pipes or power conduits acting as wave guides, to and from remote locations within the protected structure to produce false triggering of the alarm system.

Such systems were also susceptible to false triggering by metal objects such as umbrellas, baby carriages and shopping carts, where a weld or contact point between dissimilar metals produces a non-linear impedance diode effect to generate and reradiate a harmonic of the transmitted signal. Or the receiver could respond to spurious radio frequency noise from other sources such as motor ignition systems and electronic equipment.

Conversely, the system might not respond to the actual presence of a transponder element within the surveillance area if the energy picked up and reradiated as a harmonic were insufficient. For example, this could occur if the transponder antenna were improperly oriented with respect to the polarization of the transmitted field or if the antenna were to be electromagnetically shielded from the transmitter by the human body or a metallic surface. Also, proximity of the transponder to the human body can detune the resonant tank circuit, thus dissipating the harmonic energy available for reradiation to the receiver. Moreover, although signal tracking circuitry can be incorporated to adjust the frequency response of the receiver to compensate for transmitter frequency drifts, transponder efficiency suffers badly whenever the tuned tank circuit is forced to oscillate at frequencies other than its normal resonant frequency.

Later efforts to resolve the problems of such earlier systems have resulted in several variations. In one of these, which is described in U.S. Pat. No. 3,631,484 to Augenblick, the single radio frequency transmitted to the transponder to be reradiated as a harmonic is compared with signals picked up by the receiver to detect Doppler effect frequency shifts caused by movement of the transponder. Although this system eliminated problems associated with transmitter frequency drift and false alarms from stationary transponders nearby, an article moved slowly through the surveillance area would not produce a Doppler frequency shift sufficient to trigger the alarm.

Attempts were also made to investigate systems wherein the non-linear impedance element in the transponder operated as a signal mixer to generate sum and difference frequencies in response to two transmitted signals of different frequencies, as pointed out in the background discussion of U.S. Pat. No. 3,895,368 to Gordon et al. However, such dual frequency mixer systems were considered to have many practical shortcomings, which included the problem of confining higher frequency transmissions to the intended surveillance area. To overcome this problem, the Gordon et al patent describes use of a dual field system employing a high frequency electromagnetic field in conjunction with a high power, low frequency electrostatic field established between discontinuous conductors disposed on opposite sides of the surveillance space. The non-linear impedance element subjected to these two fields operates as a mixer to produce sum and difference frequencies that are reradiated to the receiver for detection. However, the power required to establish the required electrostatic field within the surveillance area is significant, and such low frequency electrostatic fields can be effectively shielded from the transponder by the human body or by a surrounding conductor and diverted from the transponder through the metallic structure of a shopping cart or the like. Also the low frequency electrostatic field could readily be diverted through nearby pipes and other metal structures to remote locations to cause false triggering by tags far outside the surveillance area, and the problem of false alarms due to dissimilar metal junctions in metal carts and the like was aggravated by concentration of the electrostatic field through such metal structures.

SUMMARY OF THE INVENTION

The present invention provides a system for detecting the presence of an article within a surveillance zone comprising:

transmitter means including antenna for radiating one or more radio frequency signals within the surveillance zone;

transponder means removably affixed to protected articles capable of being moved with an article into said surveillance zone, said transponder means having an antenna tuned to receive such radio frequency signals transmitted and a non-linear impedance element coupled to said antenna means to modify said radio frequency signals and to provide a tank circuit with a different resonant frequency for reradiating a return signal at said different resonant frequency and, receiver means including antenna means for receiving and identifying said return signal to the exclusion of the transmitted radio frequency signals to detect the presence of said transponder means in the surveillance zone;

the improvement wherein said receiver antenna means are located remotely from the transmitter antenna means.

DETAILED DESCRIPTION

Figure 1:
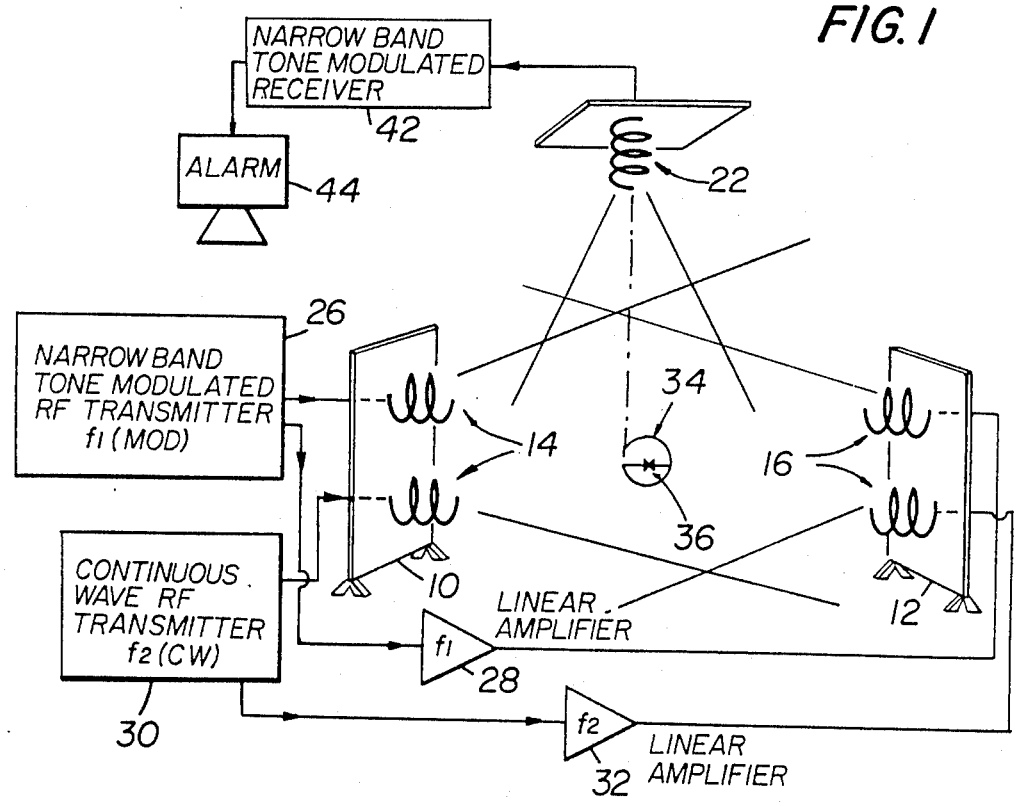
FIG. 1 is a schematic block diagram of the basic circuit elements and a partial perspective showing the antenna placement for an article surveillance system in accordance with the invention.

The preferred system is a dual frequency system comprising a pair of transmitters (one for each frequency) on each side of a surveillance zone and a receiver above the surveillance zone. The surveillance zone is typically an exit doorway of a retail store or other establishment which is protected by the system of this invention. This preferred system is an improvement on the system described in the aforesaid application of Harold B. Williams, Ser. No. 195,572 (hereinafter "the Williams application").

The present invention also provides an article surveillance system wherein a non-linear impedance element, such as a semiconductor diode, is connected to a metal antenna within a removable label or tag attached to a garment or other item of merchandise. The antenna is preferably in the form of a folded dipole with the diode connected between opposite sides of a closed loop section at one end to provide a tuned tank circuit with a resonant frequency double that of a selected center frequency. The longer antenna section extending beyond the diode closely approximates a quarter wavelength at the selected center frequency, which for example may be 915 megaHertz. Resonant frequency of the tank circuit, which is determined by the capacitance of the diode and the inductance of the adjacent closed loop section of the antenna, is double that of the selected middle frequency (e.g., 1830 megaHertz).

Two different radio frequency signals are both transmitted from a radiating antenna or antennae disposed adjacent to a surveillance area. One of the signals is generated as a continuous wave from a highly stable crystal oscillator source at a fixed frequency (e.g., 925 megaHertz) which is displaced from the selected center frequency by approximately 1%. The other signal being transmitted is tone modulated, preferably with an audio signal in the range of 1 to 20 kiloHertz, to produce a radio frequency deviation of plus and minus 5 kiloHertz in the carrier, which is also derived from a highly stable crystal oscillator source at a frequency (e.g., 905 megaHertz) which is equally displaced from the selected center frequency on the opposite side, so that the mean center frequency of the two signals equals the selected center frequency. Both transmitter signals are radiated through the surveillance zone from suitable antennae. The use of pairs of helical antennae at opposite sides of the surveillance zone results in circular polarization in the surveillance zone of the two radio frequencies being transmitted from opposite sides, to insure that radiation of both frequencies in the surveillance zone between the transmitters is adequate in all directions to accomodate any orientation of the tag, and to provide adequate radiation even when a tag is shielded from the antennas on one side by a person body or other object. On the other hand, audio modulation of one of the radio frequencies avoids creation of standing wave patterns that can result in blind spots within the surveillance area and false triggering of the system by tags outside the intended area.

A separate receiver antenna is located near and usually above the surveillance zone so that it can detect the reradiated signal at double the center frequency. In consequence the effective surveillance zone is thus determined by the intersection of the zone into which radiation occurs with the zone from which the receiver is sensitive to the reradiated energy from the tag. Designing the receiver and transmitter antennae to give appropriate beam patterns allows for control of the size and shape of the surveillance zone. A further effect of separation of antennae is that no object can be simultaneously very close to both receiver and transmitter so the whole system can be set up to provide sensitive detection of tags over a wide zone without the risk of it being triggered to respond to something which albeit crudely approximates tag behavior coming close to a unit which serves both receive and transmit functions.

Significantly, the dual frequency operation reduces the effect of transmitter frequency drift and increases the system bandwidth in regard to transponder efficiency in reradiating the incident radio frequency signals. In particular, the frequency to which the transponder antenna is tuned may fall anywhere between the two transmitted frequencies without significantly reducing transponder efficiency, thus eliminating any need for precise antenna dimensioning and minimizing problems with "body detuning" whereby the normal tuning point of the transponder is shifted downwardly in frequency due to the dielectric loading effect of a human body in contact with or in close proximity to the tag. For example, if the transponder antenna is detuned down from the selected center frequency, this merely increases the transponder efficiency relative to the lower transmitted frequency, and the overall mixer action is not seriously affected since proper mixing occurs with radio frequency power ratios of ten to one or even greater. Similarly, the effects of transmitter frequency drift are minimized in that a shift in one of the transmitters is not multiplied as with reradiated harmonics in the single frequency systems, and any drift in one can be offset by an opposite shift in the other transmitter.

The strength and frequency stability of the reradiated transponder signal, and the improbability of triggering a false response from transponders outside the surveillance area permits maximum receiver sensitivity and minimum receiver bandwidth. Signals received from a receiver antenna or antennae are applied through a very narrow bandpass filter that rejects the transmitter frequencies and then amplified so that the modulating tone can be derived using mostly conventional demodulation techniques. Preferably, the audio tone (e.g., 2 kiloHertz) is used to frequency modulate the radio frequency carrier so that the filtered and amplified signal from the receiver antenna can be applied to a passive double balance mixer that receives a lowerside injection signal (e.g., 1808.600 megaHertz) generated by a stable local oscillator source to provide a suitable intermediate frequency (e.g., 21.4 megaHertz) at the mixer output. This intermediate frequency output from the mixer is amplified and applied to another precision filter with a narrow passband (e.g., 30 kiloHertz) that defines the predetection bandwidth. Detection of the modulating tone is then accomplished through the operation of a narrowband (e.g., 30 kiloHertz) crystal discriminator, the output of which is clamped to ground until its input is of sufficient strength to generate a detector voltage that exceeds a preselected reference level which is adjusted to set the system sensitivity. With the clamp open, the tone is applied to a phase locked loop tone decoder circuit whose voltage controlled oscillator has a free-running frequency equal to that of the tone and is capable of acquiring any steady tone within a narrow frequency range (e.g., plus or minus 10 percent). When the loop acquires the tone signal, a quadrature detector senses the phase locked condition and produces a direct current output voltage to drive an operational amplifier with a capacitive feedback that sustains an output signal to trigger an alarm for some minimum time period (e.g., 3 seconds), no matter how brief the duration of the detected tone. By this means, the alarm is actuated no matter how briefly the transponder remains within the surveillance area once the detected signal is of sufficient strength and has the proper modulated frequency content. This eliminates false alarms by weak return signals from transponders outside of the surveillance area and by signals from extraneous sources that may coincidentally produce signals corresponding to the reradiated frequency, but that lack the required tone modulation.

Figure 2:
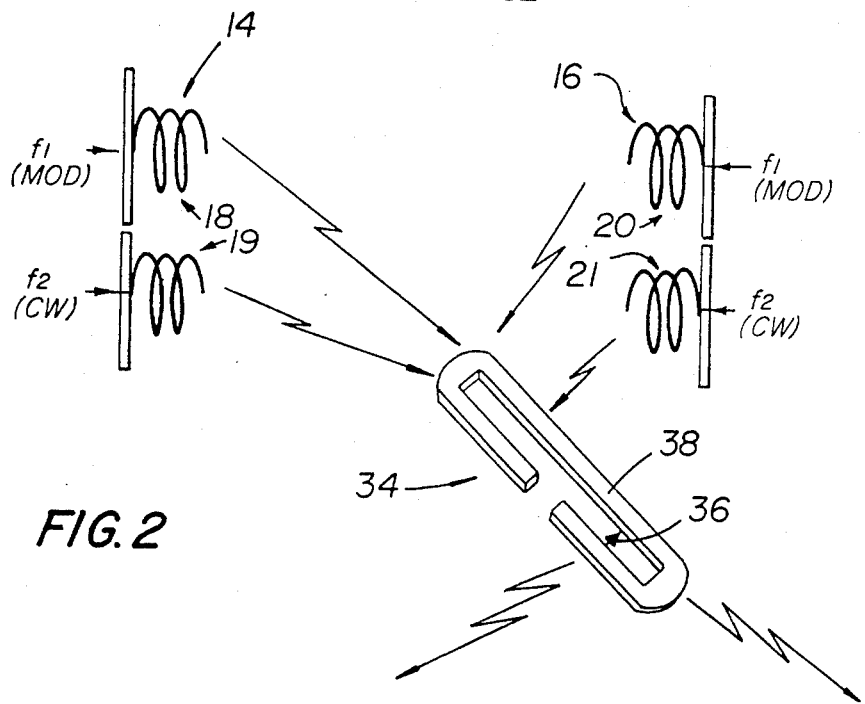
FIG. 2 is a more detailed schematic illustrating the orientation of the circularly polarized transmitter antennae with a perspective view of the operative antenna and non-linear impedance elements of the transponder.

Referring now to FIG. 1, which illustrates an article surveillance system in accordance with the invention, appropriate transmitter antenna arrays are mounted in corresponding locations on free standing pedestals 10 and 12, or if preferred on or within existing door frames on either side of a surveillance zone, typically at the entrance or exit to a retail establishment, so that anyone entering or leaving must traverse the space between them. Although shown slightly askew in FIG. 1 for illustration purposes, the respective antenna arrays on either side normally directly face one another with the respective antenna elements disposed in parallel vertical planes. The transmitter antenna arrays 14 and 16, as best seen in FIG. 2, consist of helically wound conductive metal strips 18, 19 and 20, 21, respectively, which are wound around non-conductive (typically polystyrene) cylindrical cores (not shown for the sake of clarity). The cores extend perpendicularly from conductive plates (preferably rectangular), which preferably are mounted on the back surfaces of pedestals 10 and 12. There is no direct electrical contact between the helical strips and the conductive plates. The diameters and pitches of the helical strips are chosen to match the transmitter frequencies. The individual strips 18–21 may be cut from conventional copper clad, adhesive backed tape of the type commonly used in printed circuit boards and applied to a non-conductive dielectric support with suitable low loss characteristics on the pedestal or door frame. A conductive metal panel or a small mesh grid (not shown) can be located behind and orthogonal to the axis of the antenna strips 18 to 21 to reflect and thus concentrate the transmitted signal energy and radiation pattern inwardly across the protected space for greater efficiency and to inhibit radiation of the signals from the opposite side to areas behind the pedestals 10 and 12. In the preferred form of the system, the antennae are supported on lightweight anodized aluminum frames that cover the entire back surface of the pedestals 10 and 12 and structurally support the antenna mountings and associated circuit elements.

Also mounted adjacent to, and usually above the surveillance zone, is a receiver antenna 22 that is circularly polarized. This antenna may be a crossed folded dipole configuration commonly known as a "turnstile" antenna or a helical antenna. The length of each receiver dipole segment should be a quarter wavelength of the frequency reradiated signal which, as hereinafter explained, is equal to the sum of the two transmitted frequencies. Alternatively and preferably, receiver antenna 22 may comprise a helical conductive metal strip, wound around a non-conductive cylindrical core (not shown) which extends from a conductive rectangular backing plate. There is no direct electrical contact between the strip and the backing plate.

Helical antennas have been illustrated as the preferred form of both the transmitter and receiver antennas. However, other antenna configurations may be used without losing the advantages due to this invention.

A single receiver antenna 22 has been shown for the purposes of illustration. However, a plurality of receiver antennae may be used if desired.

The receiver antenna means are remotely located from the transmitter antenna means. The receiver antenna 22 in the illustrated embodiment is at a distance of at least several feet from the closest transmitter antennae 18 and 20. This distance is somewhat more than half the width of the doorway under surveillance. Even when several receiver antennas are used, no receiver antenna is closer than several feet from the closest transmitter antenna. Positioning of the receiver antennae remote from the transmitter antennae reduces the incidence of false alarms due to the presence of metal objects, such as umbrellas and baby carriages, in the surveillance zone. When a transmitter and a receiver antenna are close together (as shown for example in FIGS. 2 and 3 of U.S. Pat. No. 4,063,229 to Welsh et al.), and a metal object is close to both, there is considerable danger of a false alarm. At the same time, the present system makes possible an increased rate of detection of articles having attached tags in the surveillance zone. The sensitivity of the present system can be set at a high level, so that a protected article at the maximum possible distance from a transmitter or receiver within the surveillance zone can be detected, without danger of a false alarm caused by a metal object which is close to both a transmitter antenna and a receiver antenna.

The angular separation between the axis (or axes) of the transmitter antenna(e) and the axis (or axes) of the receiver antenna(e) is at least about 30°. The angular separation between the transmitter antenna axes and the receiver antenna axis in the illustrated embodiment is 90°. (The axis of an antenna is the axis along which transmission or reception is at a maximum. In the case of the helical antennae illustrated, the axis of the antenna coincides with the axis of the helix). The angular separation between two lines in space is the angle between one line and a line drawn parallel to the second line and intersecting the first line. Transmitter/receiver arrangements other than that shown in FIGS. 1 and 2 can be used, provided the angular separation is at least about 30°. For example, the transmitter antennae may be located in a side panel on one side of an exit doorway and the receiver antennae in a side panel on the opposite side of the doorway. In that case the side panels must be placed at an angle of at least 30° with respect to each other, and not parallel to each other as in FIGS. 1 and 2, to achieve the desired angular separation.

There is no signal path between any transmitter and any receiver in the system of this invention. Transmission of unwanted signals to the receiver(s) is avoided in this manner. By way of contrast, FIG. 3 of U.S. Pat. No. 4,063,229 of Welsh et al. shows a system in which signal paths (68 and 73) between a transmitter and a receiver are provided.

Two distinct radio frequency signals $f_1$ and $f_2$ are generated to be radiated from the respective segments 18, 19, 20 and 21 that form the transmitter antenna arrays 14 and 16. The $f_1$ signal is a narrow band modulated radio frequency generated from a highly stable oscillator source 26 that is coupled to the transmitter antenna 18 on one side and also through a linear amplifier 28 to the opposing antenna 20 of the transmitter array 16 on the other side of the surveillance area. The other transmitter signal $f_2$ is similarly generated at a fixed radio frequency by a highly stable oscillator source 30 that is coupled to the antenna 19 of the transmitter antenna array 14 on one side, and on the other side through a linear amplifier 32 to the antenna 21 in the transmitter antenna array 16. Preferably both oscillator sources 26 and 30 employ respective temperature-compensated, crystal oscillators having cascaded frequency multiplier and narrow pass band filters for generating the continuous wave $f_2$ and the radio frequency carrier for the tone modulated signal $f_1$, as more fully described hereinafter in connection with FIGS. 3 and 4.

Generally, the capacitance between the metal strip antenna segments 18–21 and the adjacent reflective surface of the conductive panel or grid behind it is adjusted to produce a low voltage standing wave ratio (VSWR) to match the antenna input impedance with the output impedance of the respective transmitter signal source at the transmitted frequency so as to provide an effective radiation pattern with an appropriate beam width extending outward from the transmitter antenna arrays 14 and 16 on each side.

Both radio frequencies $f_1$ and $f_2$ are thus radiated from transmitter arrays 14 and 16 on opposite sides and with circular polarizations to intersect and impinge from both sides upon a transponder 34 located in the surveillance area between the two pedestals 10 and 12. Transponder 34 may be (and preferably is) similar to its counterpart in the Williams application. The transponder 34 is shown schematically in FIG. 1 as a circularly polarized antenna loop with a diode 36 connected across a short closed section of the loop. However, as shown in more detail in FIG. 2, the preferred form of the transducer 34 consists of an elongated flat metal antenna 38 loop with a central gap on one side that provides a folded dipole configuration. The overall antenna length is approximately a quarter wavelength of the mean center frequency between the two transmitted radio frequencies $f_1$ and $f_2$. The non-linear impedance element 36, which takes the form of a semiconductor diode, is connected between opposite sides of the loop near one end about midway from the side gap so that the capacitance of the diode 36 with the inductance of the adjacent closed end of the conductive loop form a tank circuit with a resonant frequency equal to or approximating the sum of the two transmitter frequencies $f_1$ and $f_2$ or, in other words, a resonant frequency twice that of the selected mean center frequency for the transmitter signals. Precise placement of the diode 36 on the antenna loop 38 to produce the desired resonant frequency and resulting reradiation from the tank circuit is not crucial and for the most part is determined empirically based on the capacitance of the selected diode and the conductive properties of the antenna loop.

Maximum transponder efficiency and selectivity is achieved where the frequency difference between the two transmitter signals $f_1$ and $f_2$ is somewhere around two percent of their mean center frequency. In the current version of the system, the frequency of the continuous wave signal $f_2$ generated by the source 30 is chosen at 925 megaHertz, whereas the frequency of the tone modulated carrier for the other transmitted signal $f_1$ from the source 26 is at 905 megaHertz. Thus their mean center frequency is 915 megaHertz, and the resonant tank circuit frequency is 1,830 megaHertz. These particular frequencies are selected to fall within the available spectrum transmission bands available for such purposes in the U.S. On the other hand, to comply with international broadcast standards, it is contemplated that the system would for example be designed to have a resonant tank circuit frequency of about 4,900 megaHertz with transmitter frequencies of around 2,420 and 2,480 megaHertz.

In operation, when both transmitted signals $f_1$ and $f_2$ are received by the transponder antenna loop 38, they are mixed through the non-linear impedance effect of the semiconductor diode 36 to initiate tank circuit oscillation at its resonant frequency. which is equal to the sume of the $f_1$ and $f_2$ frequencies. Increased mixing and overall transponder efficiency is enhanced through use of a Schottky diode.

The approximate two percent frequency separation between the transmitted signals provides important advantages in maximizing transponder efficiency and in the ability of the system to avoid false alarms because the transponder return signal "stands out" from that might be produced by dissimilar metal objects such as umbrellas, shopping carts and the like, which have tended to cause false alarms with previous systems. In particular, the bandwidth of the transponder 34 relative to the incident radio frequencies is broadened without reducing its efficiency because the transponder antenna 38 can be tuned to fall anywhere between the two transmitter frequencies, which also minimizes the effects of "body detuning" in that the downward shift in frequency due to such dielectric loading effects can easily be accommodated within this range. This results from the fact that tuning or detuning of the antenna 38 more toward one transmitter frequency than the other only serves to enhance the signal strength at that frequency without reducing mixer conversion efficiency because proper radio frequency mixing can occur with power ratios of ten to one or greater between the signals.

Because the acceptance zone for the receiver 22 is different from the radiation zone from the transmitters 14 and 16 the detection of tags in remote locations outside of the combined surveillance area is greatly reduced. Internal non-linearities which may unavoidably arise in a transmitter can create harmonic signals which might reach a sensitive receiver, but because of the neccessity for the mixing of two frequencies in the system, any such signal is at a frequency widely displaced from that of the desired transponder return. For example, with the current system parameters, non-linear distortions would produce doubling frequencies of 1,810 or 1,850 megaHertz, both displaced by a full 20 megaHertz from the normal return frequency at 1,830 megaHertz. These displaced frequencies would be subject to considerable attenuationin the tuned tank circuit, further attenuated by the separation of transmission and reception components and readily distinguishable by conventional filtering techniques from a legitimate mixed frequency response at 1,830 megaHertz.

In this regard, signals picked up by the receiver antenna 22 are applied to a narrow band tone modulated receiver 42. The mixing of the two transmitted signals in the transponder return signal permits the response of the receiver 42 to be restricted to very narrowband operation that serves to eliminate false alarm responses due to extraneous noise and transmission signals from other sources. Indeed the receiver bandwidth needed is for the most part dependent only upon the frequency stability of the transmittter sources 26 and 30, thus permitting a very narrow detection "window" corresponding to the possible transmitter frequency drift. With very stable transmitter oscillator sources as hereinafter described, the bandwidth of the received signals available for detection of the modulating tone (i.e., the predetection bandwidth) can be extremely narrow, and the bandwidth of the receiver (post detection) can be further narrowed in precise detection of the modulating tone. Moreover, system reliability and sensitivity is further enhanced by having the receiver 42 supply an output signal to actuate an alarm 44 only when the strength of the modulating tone signal detected exceeds a selected minimum amplitude level for a predetermined fixed interval to insure the actual presence of a transponder within the detection zone.

The circuits described with reference to FIGS. 3 to 6 may be identical or similar to their counterparts in the Williams applications.

Figure 3:
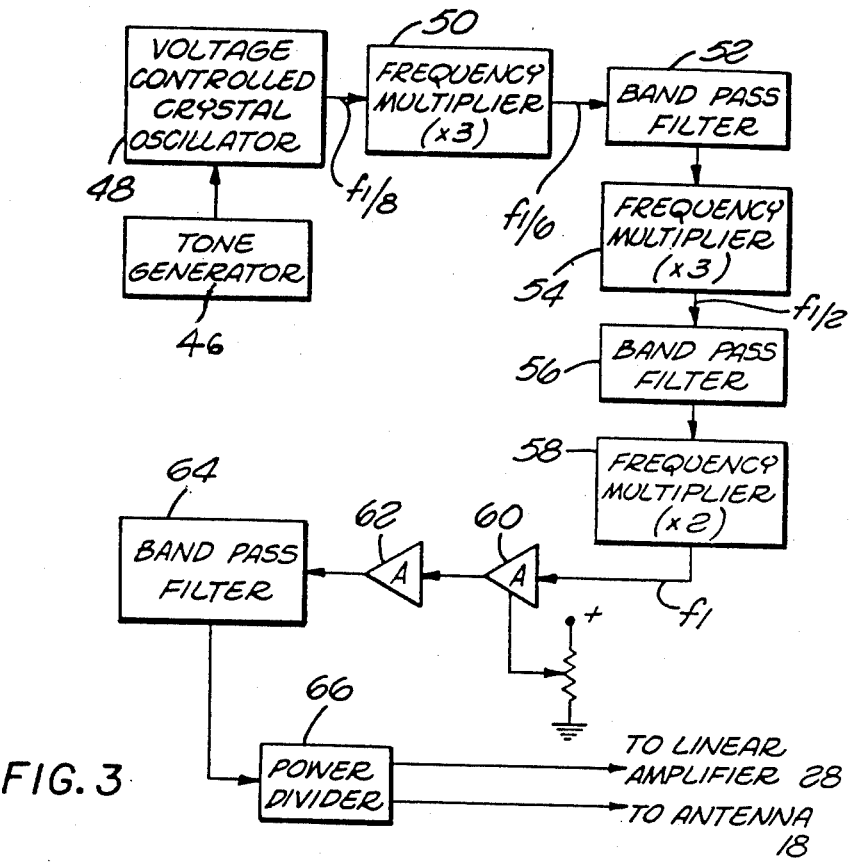
FIG. 3 is a more detailed block and circuit diagram schematic illustrating a preferred form of the narrow band tone modulated RF transmitter of FIG. 1.

Referring now to FIG. 3, the preferred embodiment now in operation generates the transmitter signal $f_1$ as a very stable, narrowband frequency modulated signal to maximize system sensitivity and selectivity. A stable crystal controlled tone generator 46 of conventional design generates a fixed frequency tone in the audio range of one to twenty kiloHertz. This tone, which in the current system is at about 2 kiloHertz, is applied as a modulating signal to a voltage controlled crystal oscillator 48 to frequency modulate its output. In the preferred embodiment, the crystal oscillator 48 is of conventional design with precise temperature compensation capable of holding a frequency stability of 0.7 cycles per million from 5° C. to 45° C. at a frequncy of approximately 50.3 megaHertz. The amplitude of the modulating signal from the tone generator 46 applied to the voltage control circuit is adjusted to produce a maximum frequency deviation of plus or minus only about 0.25 to 0.30 kiloHertz, thus resulting in only very narrowband modulation of the oscillator carrier. The modulated output of the oscillator 48 is then applied to a conventional frequency multiplier 50 which triples the oscillator frequency that is then applied to a narrowband two pole bandpass filter 52. This filtered multiplier signal is then applied to another conventional frequency multiplier 54, which again triples the available frequency to be applied to another narrowband pass filter 56. The filtered output from the bandpass filter 56 is then applied to yet another frequency multiplier 58 that this time only doubles the input frequency to produce the desired modulated output signal ($f_1$) at 905 megaHertz with a narrowband modulation deviation of plus or minus 5 kiloHertz, which is then applied to a variable gain RF amplifier 60 and power amplifier 62. This amplifier transmitter signal $f_1$ is passed through a narrowband three pole bandpass filter 64 to a power divider 66 that delivers the transmitter signal to the antenna 18 on the transmitter array 14 of the pedestal 10, and also through a lightweight cable connector to the linear amplifier 28 and hence to the antenna 20.

Figure 4:
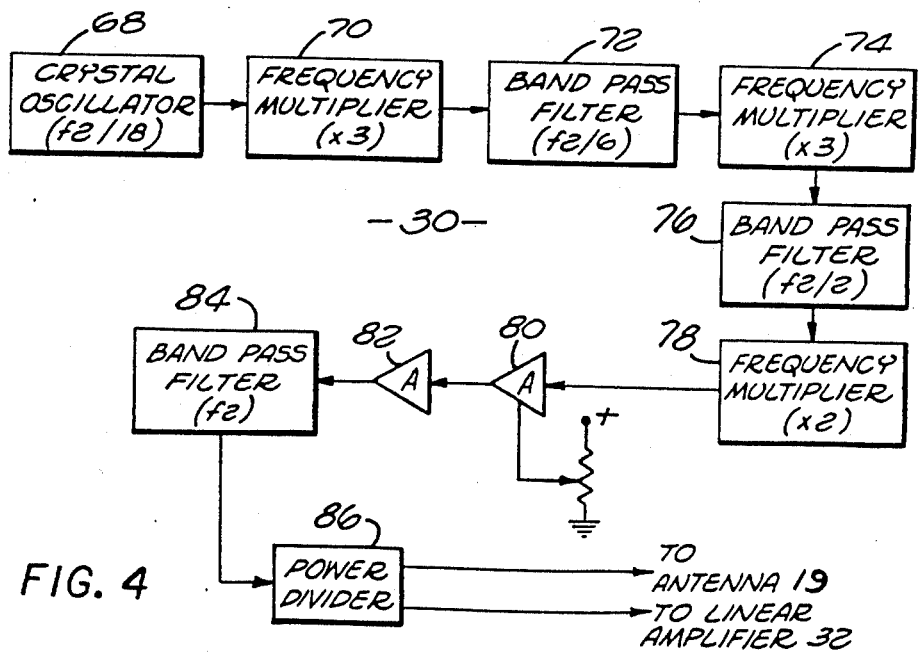
FIG. 4 is a detailed block and circuit diagram showing the preferred form of a continuous wave RF transmitter of FIG. 1.

Referring now to FIG. 4, the other transmitter frequency $f_2$ is generated in a similar fashion using a conventional temperature compensated, crystal oscillator 68 that is capable of holding the frequency to 0.5 parts per million from 5° C. to 45° C. with an output frequency of about 51.4 megaHertz. This output frequency is tripled by frequency multiplier 70 to be filtered by a two pole bandpass filter 72. The narrowband output from the filter 72 is then applied to another frequency multiplier 74 which again triples the frequency to be applied through another two pole bandpass filter 76, and the filtered output frequency is then doubled in a final frequency multiplier 78 to produce the desired $f_2$ signal at 925 megaHertz. The $f_2$ signal is applied to the input of an RF variable gain amplifier 80 and the further amplifier stage 82 to reach a desired transmitting power level. The amplified output is then filtered through a narrowband, three pole bandpass filter 84 to remove any amplified distortions or harmonics and apply it to a power divider 86 to be applied directly to the antenna 19 in the transmitter array 14 on the pedestal 10 and through an appropriate RF coupling to the respective linear amplifier 32 and hence to the antenna 21 on the opposite pedestal 12. Because of the great efficiency and sensitivity achieved, the transmitted power of these signals is an order of magnitude below that required in earlier systems to achieve the same coverage, thus allowing larger surveillance zones and/or reducing stray transmissions.

Figures 5, 6:
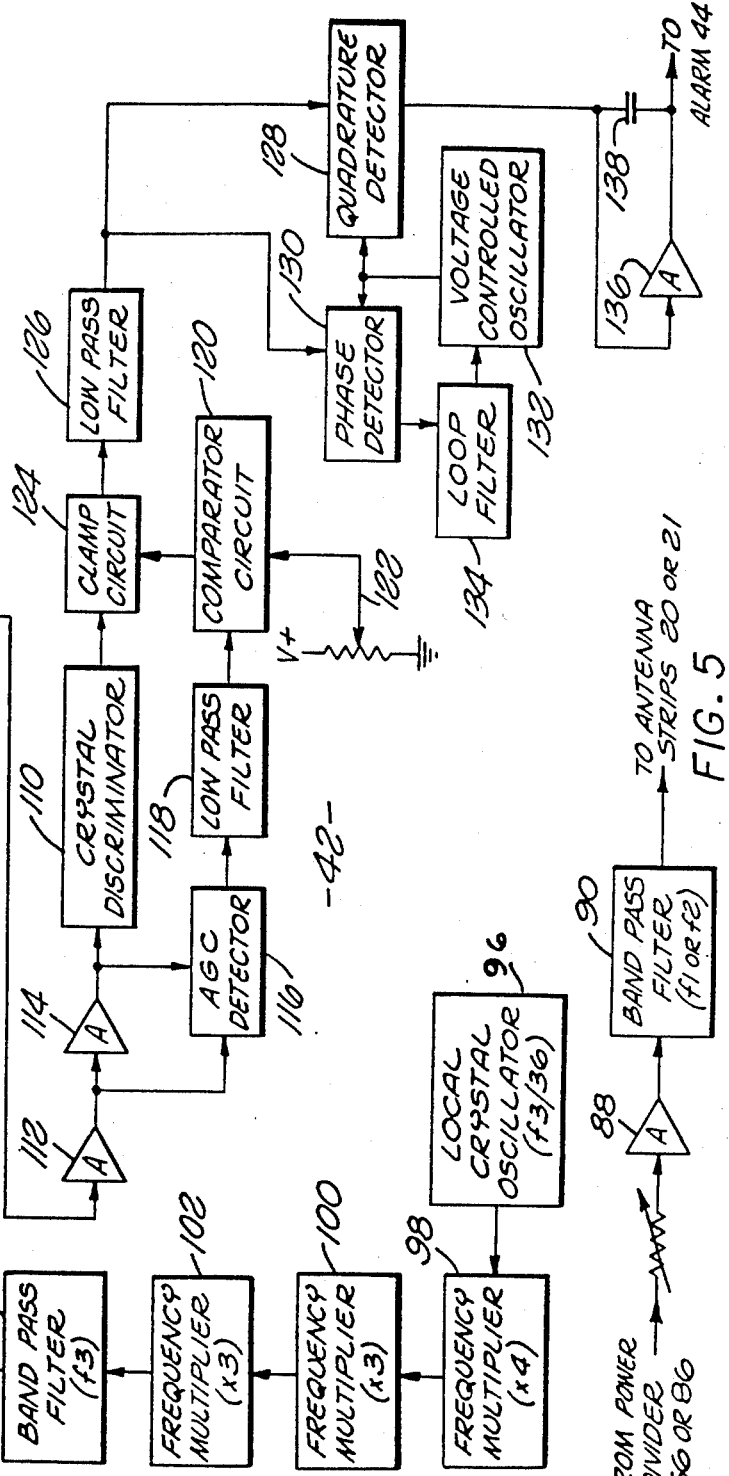
FIG. 5 is a block and circuit diagram illustrating a preferred form of the linear amplifiers shown in FIG. 1; and, FIG. 6 is a detailed block and circuit diagram illustrating the preferred form of the narrow band tone modulated receiver of FIG. 1 wherein the transmitted signal is frequency modulated.

Referring to FIG. 5, the respective $f_1$ and $f_2$ signal outputs from the power divider 66 or 86 can be connected to the respective linear amplifiers 28 and 32 at the opposite antenna pedestal 12 by simple wire leads or lightweight cable, thus eliminating the need for the expensive and difficult installation of heavy and bulky high grade RF cable connections required in previous systems to avoid power loss. Linear amplifiers 28 and 32 each simply consist of a variable radio frequency amplifier stage 88, the output of which is applied through a narrowband three pole bandpass filter 90 to remove any signal distortion or noise picked up on the connecting line or generated in the amplification process. The gain of the amplifier stage 88 is adjusted to restore the transmitter signal strength to approximately the same level being supplied to the transmitter antenna on the opposite side of the surveillance zone.

Referring now to FIG. 6, in the preferred embodiment employing narrow band frequency modulation of the $f_1$ transmitter signal, the signals picked up by the receiver antenna 22 are applied to a very narrow band, four-pole band pass filter 92, the passband being centered at the mean frequency of the mixed transponder return signal—for example, at 1830 megaHertz. In the particular system being described, a valid return signal from the transponder 34 is frequency modulated with a single fixed audio tone, preferably at 2 kiloHertz to provide a maximum deviation of only 5 kiloHertz on either side of the 1830 megaHertz carrier frequency. The band pass filter is designed to reject the lower frequency transmitter signals by a minimum of 60 db to prevent internal mixing due to circuit non-linearities. A filtered output from the bandpass filter 92 is applied to a double balanced mixer 94 to be mixed with lower side injection frequency $f_3$ at 1808.600 megaHertz, for example, from a stable local oscillator source to produce an intermediate frequency (IF) output of 21.4 megaHertz at its output when a valid transponder return signal is present. This lower side injection frequency is likewise generated from a highly stable, temperature compensated crystal oscillator 96 operating at about 50.24 megaHertz. This oscillator frequency is initially quadrupled in a frequency multiplier 98 and applied successively through two tripling frequency multipliers 100 and 102 to a four-pole narrow band pass filter 104 to supply the lower side injection signal to the mixer 94.

The intermediate frequency output of the balanced mixer 94 is applied to a low noise amplifier 106 to establish the overall receiver noise figure at 12 db to be fed into a four-section monolithic crystal band pass filter 108, preferably the Model 1619-1622 produced by Piezo Technology, Inc. unde its registered trademark "Com-line", wherein the response of amplitude versus frequency is 30 kiloHertz at the −3 db points. The crystal band pass filter 108 effectively determines the predetection band width, and along with the 12 db noise figure and modulation index of five, provides an overall receiver sensitivity of −113 dbm for a 20 db S+N/N ratio at the output of a crystal discriminator 110 described in more detail hereinafter. The output from the crystal band pass filter 108 passes through successive RF amplifier stages 112 and 114, each of which is provided on a chip with the option of automatic gain control capability, to provide the desired input level to the crystal discriminator 110. The output of each stage 112 and 114 causes their respective automatic gain control circuits to generate direct currents as measures of the amplitudes of their inputs. These respective measures from the individual stages 112 and 114 are summed together to operate an overall signal strength detector 116 whose output is a direct current proportional to the combined output amplitude of each stage which is indicative of the initial transponder signal strength from band pass filter 108. This combined detector output is fed to a low pass filter 118 having a predetermined time constant to produce a gradually increasing charge at a rate proportional to the strength of the transponder return signal being detected. The output charge from the low pass filter 118 is delivered to a comparator circuit 120 to be compared with a preselected threshold level established by the sensitivity setting on a potentiometer 122.

In the preferred form of the system, the crystal discriminator 110 consists of a monolithic crystal filter of the type available from Piezo Technology, Inc. as its Model 2378F which is combined with an RCA integrated circuit Model CA3089E as described in the pertinent data sheet, to produce an extremely narrowband stable discriminator with a bandwidth in the order of only 30 kiloHertz. With a valid transponder return signal, the output of the discriminator 110 constitutes the modulating audio tone, which in the existing system is at two kiloHertz. However, the output of the discriminator 110 is maintained at ground potential by a clamp circuit 124 until a triggering output from the comparator circuit 120 indicates that the charge built up on the low pass filter 118 exceeds the selected sensitivity setting from the potentiometer 122. This permits the system to be set at a sensitivity level that ignores transitory or weak return signals from remote transponders or other sources.

Once the clamp circuit 124 is open, the two kiloHertz audio tone is applied through a low pass filter 126 to be decoded by conventional phase locked loop techniques using a quadrature detector 128 and phase detector 130 that is capable of acquiring any steady tone within 10% of the modulating tone frequency established as the free running frequency of voltage controlled oscillator 132. In the conventional manner, the output of the phase detector 130 is applied to a loop filter 134 to produce a signal for adjusting the frequency and phase of the voltage controlled oscillator 132 to achieve phase lock. The quadrature detector 128 then provides its output to a conventional operational amplifier 136 having feedback capacitor 138 that maintains an output signal for triggering a suitable alarm 44 for providing an audible or visual response for a selected time interval no matter how brief the initial response. In this manner, the strong response produced by the presence of a transponder in the surveillance area between the antenna pedestals 10 and 12 initiates a full scale alarm response no matter how quickly the protected item is moved through the area, but the system is able to ignore even continued low level response signals from outside of the immediate protected area.

The system of this invention is intended for use where the transmitter frequency is (or frequencies are) at least about 400 MHz. Antenna size is correlated with wavelength as is well known, and it is impractical to build such directional antennae small enough for article surveillance systems having transmitter frequencies below about 400 MHz. The present system is well suited for use in the U.S. FCC—authorized frequency range centered on 915 MHz. For other applications the same restriction may not apply.

Although the system has been described in connection with a preferred embodiment employing specifically described circuit elements and techniques with their operating parameters pertinent to an existing preferred embodiment using audio tone frequency modulation, it should be understood that the invention may be implemented employing various modifications and variations of the circuit elements and techniques without departing from the spirit or scope of the invention as defined in the appended claims. For example, the system might be implemented to employ amplitude modulation of one of the transmitted radio frequencies, rather than frequency modulation, or to employ modulating tones outside the audio range without discarding the basic operational advantages inherent in this unique overall system approach. Likewise the antennae may be chosen to give different beam patterns to suit the size and shape of the desired surveillance zone and may be constructed in various forms. Furthermore, the receiver antenna need not be located overhead but could be in any location which provides proper surveillance since no direct connection between transmitters and receivers is required in this system. Since the system provides all the necessary radiation from each of the source arrays it can function with only one.

What is claimed is:

1. In a system for detecting the presence of an article within a surveillance zone, comprising:

transmitter means, including transmitter antenna means associated therewith, for radiating into said surveillance zone at least one alternating electromagnetic signal having a frequency of at least about 400 MHz;

transponder means affixable to said article and capable of being moved into said zone therewith, said transponder means being responsive to said electromagnetic signal to radiate a return signal of a frequency different from that of said radiated signal from said transmitter antenna means;

receiver means, comprising receiver antenna means, for receiving and identifying said return signal to the exclusion of said transmitted signal;

the improvement wherein;

(a) said transmitter antenna means comprise at least two transmitter antennas and said receiver antenna means comprise at least one receiver antenna;

(b) each of said transmitter and receiver antennas is characterized by a directional antenna pattern having a narrow beam width;

(c) each of said transmitter antennas is outside said pattern of each of said at least one receiver antenna, and each of said at least one receiver antenna is outside said pattern of each of said transmitter antennas;

(d) said patterns of said transmitter antennas and of said at least one receiver antenna all intersecting each other in an intersection zone defining said surveillance zone; and wherein said at least two transmitter antennas directly face each other with the axes of their patterns substantially collinear, and said at least one receiver antenna comprises a receiver antenna the axis of the pattern of which is substantially at right angles to said collinear axes of said two transmitter antennas.

2. The system of claim 1, wherein:

said receiver antenna is spaced above said surveillance zone with said axis thereof directed downwardly, and said two transmitter antennas are spaced laterally outwardly from the sides of said surveillance zone.

* * * * *